United States Patent
Camenisch et al.

(10) Patent No.: US 10,229,285 B2
(45) Date of Patent: Mar. 12, 2019

(54) PRIVACY ENHANCED CENTRAL DATA STORAGE

(71) Applicant: International Business Machines Corporation, Armonk, NY (US)

(72) Inventors: Jan L. Camenisch, Thalwil (CH); Maria Dubovitskaya, Zurich (CH); Anja Lehmann, Zurich (CH); Gregory Neven, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 15/076,806

(22) Filed: Mar. 22, 2016

(65) Prior Publication Data

US 2017/0277906 A1    Sep. 28, 2017

(51) Int. Cl.
| | |
|---|---|
| *H04L 29/06* | (2006.01) |
| *G06F 7/04* | (2006.01) |
| *H04L 9/00* | (2006.01) |
| *H04L 9/28* | (2006.01) |
| *G06F 7/00* | (2006.01) |

(Continued)

(52) U.S. Cl.
CPC .... *G06F 21/6227* (2013.01); *G06F 17/30091* (2013.01); *G06F 17/30321* (2013.01); *G06F 21/6254* (2013.01); *G06F 2221/2107* (2013.01)

(58) Field of Classification Search
CPC .......... G06F 21/6227; G06F 17/30321; G06F 2221/2107
USPC ...................... 713/165; 726/26; 380/262, 28; 707/694, 696
See application file for complete search history.

(56) References Cited

U.S. PATENT DOCUMENTS 6,134,551 A * 10/2000 Aucsmith ............... G06F 21/34
8,788,843 B2    7/2014 Kopasz et al.
(Continued)

FOREIGN PATENT DOCUMENTS

CN    102714790 A    10/2012

OTHER PUBLICATIONS

M. Suriyapriya et al., "Attribute Based Encryption with Privacy Preserving in Clouds." International Journal on Recent and Innovation Trends in Computing and Communication. vol. 2 Issue: 2. ISSN: 2321-8169. (6 pgs). 2014.

(Continued)

*Primary Examiner* — Aravind K Moorthy
(74) *Attorney, Agent, or Firm* — Cantor Colburn LLP; Daniel Morris

(57) ABSTRACT

The invention performs anonymous read/write accesses of a set of user devices to a server. Write accesses of the user devices of the set comprise generating an encrypted file by an anonymous encryption scheme; computing a pseudorandom tag; indexing the encrypted file with the tag as user set index of the user set and writing the encrypted file and the associated tag to the a storage system of the server. Read accesses of the user devices of the set comprise downloading tag data corresponding to a plurality of tags from the server, the tag data enabling the user devices of a respective set to recognize so-called "own" tags computed by one of the user devices of the respective set of user devices; determining the own tags among the plurality of tags; reading one or more encrypted files associated to the own tags; and decrypting the encrypted files.

17 Claims, 10 Drawing Sheets

(51) Int. Cl.
    *G06F 21/62*          (2013.01)
    *G06F 17/30*          (2006.01)

(56)                References Cited

U.S. PATENT DOCUMENTS

| | | |
|---|---|---|
| 8,925,075 B2 | 12/2014 | Krendelev et al. |
| 9,160,535 B2 | 10/2015 | Burchett et al. |
| 2010/0191975 A1 | 7/2010 | Chase et al. |
| 2010/0325441 A1 | 12/2010 | Laurie et al. |
| 2012/0036356 A1* | 2/2012 | Barbat .................. G06F 19/323 |
| | | 713/165 |
| 2014/0068254 A1 | 3/2014 | Scharf et al. |
| 2014/0289528 A1 | 9/2014 | Baghdasaryan |
| 2014/0304277 A1* | 10/2014 | Veugen .................. G06Q 30/02 |
| | | 707/748 |
| 2015/0180905 A1 | 6/2015 | Ruppin et al. |
| 2017/0012778 A1* | 1/2017 | Choyi .................. H04L 63/0884 |
| 2017/0026350 A1* | 1/2017 | Dawoud ............. H04L 63/0471 |
| 2017/0053408 A1* | 2/2017 | Manweiler ........ G06F 17/30256 |
| 2017/0060941 A1* | 3/2017 | Yan .................. G06F 17/30091 |

OTHER PUBLICATIONS

International Search Report and Written Opinion dated May 31, 2017 cited in Application No. PCT/IB2017/051082, 13 pgs.

\* cited by examiner

PRIVACY ENHANCED CENTRAL DATA STORAGE

BACKGROUND

The present invention relates to a computer-implemented method for performing anonymous read/write accesses of a set of user devices to a server. The set of user devices is associated to a user or user group. The present invention further relates to a corresponding server, corresponding user devices and a corresponding computer program product.

Many users of electronic devices have a set of multiple devices that they use to perform electronic transactions, e.g., one or more mobile phones, laptops, tablet computers and/or desktop computers. Such sets of devices may only be used by a single person or may be shared by a group of persons, e.g., by members of a family.

Electronic transactions usually involve authentication towards a service provider. The latter may include initially the establishment of an account and corresponding credentials with the respective service of the service provider operating the server and subsequently reconnecting to the service and identifying as the account holder. The transactions also resolve in electronic data that are processed and stored on the user devices. When using multiple devices of a set, it is a challenge to synchronize the data between these devices.

One possible solution is to store all data on a server in the cloud and then retrieve the information from the cloud onto the devices whenever the data is needed. After a transaction is done, the updated information is again deposited in the cloud. For such an approach all user devices of the set may share the same encryption/decryption key.

One problem with this approach is that a lot of collateral information may leak to the cloud provider. More particularly, the cloud provider may learn which users retrieve and deposit information at what time.

US 2015/0180905 A1 discloses a system and method for secure synchronization of data across multiple computing devices. The method comprises detecting a file content update on a first client computer system, the file to be synchronized on a plurality of different types of client computer systems in a plurality of formats. The method further comprises associating a security policy with the file, wherein the security policy includes restrictions to limit one or more actions that can be performed with the file, and synchronizing the file to a second client computing system while applying the security policy to provide controls for enforcement of the restrictions at the second client computer system.

US 2014/0068254 discloses systems and methods for upload and/or download streaming encryption to/from an online service, or cloud-based platform or environment. The encryption process includes upload encryption, download decryption, and a central piece of infrastructure called the Interval Key Server (IKS). During both upload and download, the encryption and decryption processes are performed while the files are being uploaded/downloaded.

U.S. Pat. No. 8,925,075 B2 discloses a method for protection of cloud computing including homomorphic encryption of data. The proposed scheme can be used with both an algebraic and analytical approaches. A cloud service is implemented on a server. A client encrypts data using fully homomorphic encryption and sends it to the server. The cloud server performs computations without decryption of the data and returns the encrypted calculation result to the client. The client decrypts the result, and the result coincides with the result of the same calculation performed on the initial plaintext data.

US 2010/0325441 discloses systems and methods for privacy-preserving flexible user-selected anonymous and pseudonymous access at a relying party (RP), mediated by an identity provider (IdP). Anonymous access is unlinkable to any previous or future accesses of the user at the RP. Pseudonymous access allows the user to associate the access to a pseudonym previously registered at the RP. A pseudonym system is disclosed. The pseudonym system allows a large number of different and unlinkable pseudonyms to be generated using only a small number of secrets held by the user.

Accordingly there is a need to provide methods and corresponding user devices and servers that allow a privacy-enhanced storage of data at a central server. Furthermore, there is a need to provide methods and corresponding user devices allowing multiple user devices of a set to store synchronize and retrieve their data at/from such a central server in a privacy-enhanced way.

BRIEF SUMMARY

According to a first aspect, the invention is embodied as a computer-implemented method for performing anonymous read/write accesses of a set of user devices to a server. The set of user devices is associated to a user or user group. Write accesses of one of the user devices of a set comprise creating an encrypted file by an anonymous encryption scheme; computing a pseudorandom tag; indexing the encrypted file with the tag as user set index of the user set and sending the encrypted file and the associated tag to a storage system of the server. Read accesses of the user devices of the set comprise downloading tag data corresponding to a plurality of tags from the server. The tag data enables the user devices of a respective set to recognize its own tags computed by one of the user devices of the respective set of user devices. The read access further comprises determining the user devices' own tags among the plurality of tags; reading one or more encrypted files associated to the user devices' own tags and decrypting the encrypted files.

One idea according to one or more embodiments of the invention is to use an anonymous encryption scheme for each write access of the user devices, e.g. if the user wants to save an update of a file. Each time a device wants to make an update, it generates a fresh encrypted file that cannot be linked to the old file by using the anonymous encryption scheme.

According to one or more embodiments, an anonymous encryption scheme may be defined as a scheme that does not reveal any information about the identity of the secret key and the secret-key holder. In case of an asymmetric anonymous encryption scheme, the ciphertext does not reveal any information about the public key that was used to create the ciphertext.

To be able to efficiently recognize an encrypted file deposited by another device of the set of user devices, the encrypted files are indexed with a pseudorandom tag. Such pseudorandom tags are unlinkable to each other for the server. However, the tags are generated in such a way that a user device can recognize its own tags, i.e. the tags the user device has generated itself as well as the tags that have been generated by another user device of the respective set of user devices. Accordingly, the devices of a set of user devices can recognize their own tags and then download the corresponding encrypted file. This allows them to write and read files of the various user devices of a set in a privacy enhanced way.

According to one or more embodiments, computing a pseudorandom tag comprises computing a pseudorandom function of a seed and a tag number. The tag number is a unique number for the computation of the tags of the set of user devices.

This is an efficient, reliable and elegant way to generate tags that cannot be linked by the server, but can be recognized by the user devices of a set of user devices. More particularly, all the user devices of a set can recognize the pseudorandom function and the seed and can check by the unique tag numbers whether the downloaded tag data matches with tags that have been generated by one of the devices of the respective set.

According to one or more embodiments, the method comprises providing the user devices with one or more encryption keys and one or more corresponding decryption keys of the anonymous encryption scheme, providing the user devices with a joint pseudorandom function and a joint seed, encrypting a file to be stored with at least one of the one or more encryption keys and computing the pseudorandom tag by means of the pseudorandom function from the joint seed and the tag number.

This is an efficient, reliable and elegant way to generate tags that cannot be linked by the server, but can be recognized by the user devices of a set of user devices.

More particularly, all the user devices of a set are in possession of the joint pseudorandom function and the joint seed. This allows checking by the unique tag numbers whether the downloaded tag data matches with tags that have been generated by one of the devices of the respective set.

The one or more encryption keys may be secret keys of a symmetric encryption scheme or public keys of an asymmetric encryption scheme. According to embodiments the user devices may all use the same encryption key as a joint encryption key or they may use different encryption keys for each device. In the latter embodiment the user devices are provided with their respective decryption keys.

According to one or more embodiments, the tag number is a counter value computed by a counter of the user devices. According to such embodiments, all the user devices of a set are equipped with a counter for generating the tag numbers. This is an efficient and elegant way to keep track of the tag numbers that have been used to generate tags. Furthermore, each of the user devices of the set is aware of the scheme according to which the other user devices of the set generate their tag numbers. This facilitates synchronization of the user devices of a set. Furthermore, the user devices only need to check the tag numbers of their own set. This facilitates an efficient computation of matches.

According to one or more embodiments, the tag number is a nonce generated by the user devices. Furthermore, a write access comprises writing the nonce together with the encrypted file and the associated tag to the server and a read access comprises downloading the tag data and the corresponding nonces from the server.

This is another efficient way of generating and tracking tag numbers that have been used by a respective set.

According to one or more embodiments, the tag number is a server index provided by the server.

According to such embodiments the tag numbers are centrally provided by the server. This is another efficient way of generating and tracking tag numbers that have been used by a respective set.

According to one or more embodiments, reading one or more encrypted files comprises performing a private information retrieval (PIR) protocol.

Such PIR protocols are known in the art and may ensure that the server gets no information on the identity of the file retrieved by the user device. Hence with such a PIR-protocol it may be ensured that the server and an associated cloud service do not learn which encrypted file a device is downloading. This further enhances the privacy.

According to one or more embodiments, reading one or more encrypted files comprises performing an oblivious transfer protocol.

With such an oblivious transfer protocol it may be ensured that the server and an associated cloud service do not learn which encrypted file a device is downloading. This further enhances the privacy.

According to one or more embodiments determining own tags comprises computing comparison tags by computing a pseudorandom function of the seed and a predefined set of tag numbers. Furthermore, the downloaded tag data is compared with the computed comparison tags to identify matching tags. Herein the predefined set of tag numbers comprises tag numbers that have been previously used by user devices of one or more sets of user devices.

This is an efficient and reliable way to determine own tags.

According to one or more embodiments, downloading tag data comprises downloading a plurality of tags. According to such embodiments, the user devices read/download the tag data itself from the server. This allows a direct comparison of the tags.

According to one or more embodiments, downloading tag data comprises downloading one or more bloom-filters. The bloom-filter comprises a mapping of the tags to one or more positions of an array of the bloom-filter.

This is an efficient and fast way to check whether computed comparison tags are a member of tags represented by the bloom-filter.

According to another aspect of the invention, one or more embodiments are a computer-implemented method for providing anonymous storage services to a set of user devices by a server, the set of user devices being associated to a user or user group. The method comprises, at the server, the steps of receiving a file to be stored, the file being encrypted according to an anonymous encryption scheme; receiving a pseudorandom tag as user set index and storing the encrypted file together with associated tag data, the tag data enabling the user devices of a respective set to recognize own tags computed by one of the user devices of the respective set of user devices. The method further comprises providing, in response to a read request of a user device, tag data corresponding to a plurality of tags to the user device.

In one or more embodiments, the storage services are provided in a cloud environment.

According to another aspect of the invention, one or more embodiments are a server for providing anonymous storage services to a set of user devices is provided. The set of user devices is associated to a user or user group. The server is configured to receive a file to be stored which is encrypted according to an anonymous encryption scheme. The server is further configured to receive a pseudorandom tag as user set index; store the encrypted file together with associated tag data, the tag data enabling the user devices of a respective set to recognize own tags computed by one of the user devices of the respective set of user devices and provide, in response to a read request of a user device, tag data corresponding to a plurality of tags to the user device.

In one or more embodiments, the server is configured to provide storage services in a cloud environment.

According to another aspect of the invention, one or more embodiments provide a user device for performing anonymous read/write accesses to a server. The user device is associated to a user or user group. The user device is configured to perform write accesses comprising generating an encrypted file by an anonymous encryption scheme; computing a pseudorandom tag; indexing the encrypted file with the tag as user set index of the user set and sending the encrypted file and the associated tag to a storage system of the server. The user device is further configured to perform read accesses comprising downloading tag data corresponding to a plurality of tags from the server, the tag data enabling the user devices of a respective set to recognize own tags computed by one of the user devices of the respective set of user devices. The user device is further configured to determine the own tags among the plurality of tags, to read one or more encrypted files associated to the own tags and to decrypt the encrypted files.

According to yet another aspect, one or more embodiments provide a computer program product for anonymous read/write accesses of a set of user devices to a server. The set of user devices is associated to a user or user group. The computer program product comprises a non-transitory computer readable storage medium having program instructions embodied therewith, the program instructions executable by the user devices to cause the user devices to perform a method comprising performing write accesses comprising generating an encrypted file by an anonymous encryption scheme; computing a pseudorandom tag; indexing the encrypted file with the tag as user set index of the user set; and sending the encrypted file and the associated tag to a storage system of the server. Furthermore, the program instructions cause the user devices to perform a method comprising performing read accesses comprising downloading tag data corresponding to a plurality of tags from the server, the tag data enabling the user devices of a respective set to recognize own tags computed by one of the user devices of the respective set of user devices. Furthermore, the program instructions cause the user devices to perform a method comprising determining the own tags among the plurality of tags, reading one or more encrypted files associated to the own tags and decrypting the encrypted files.

Embodiments of the invention will be described in more detail below, by way of illustrative and non-limiting examples, with reference to the accompanying drawings.

DETAILED DESCRIPTION

Figure 1:
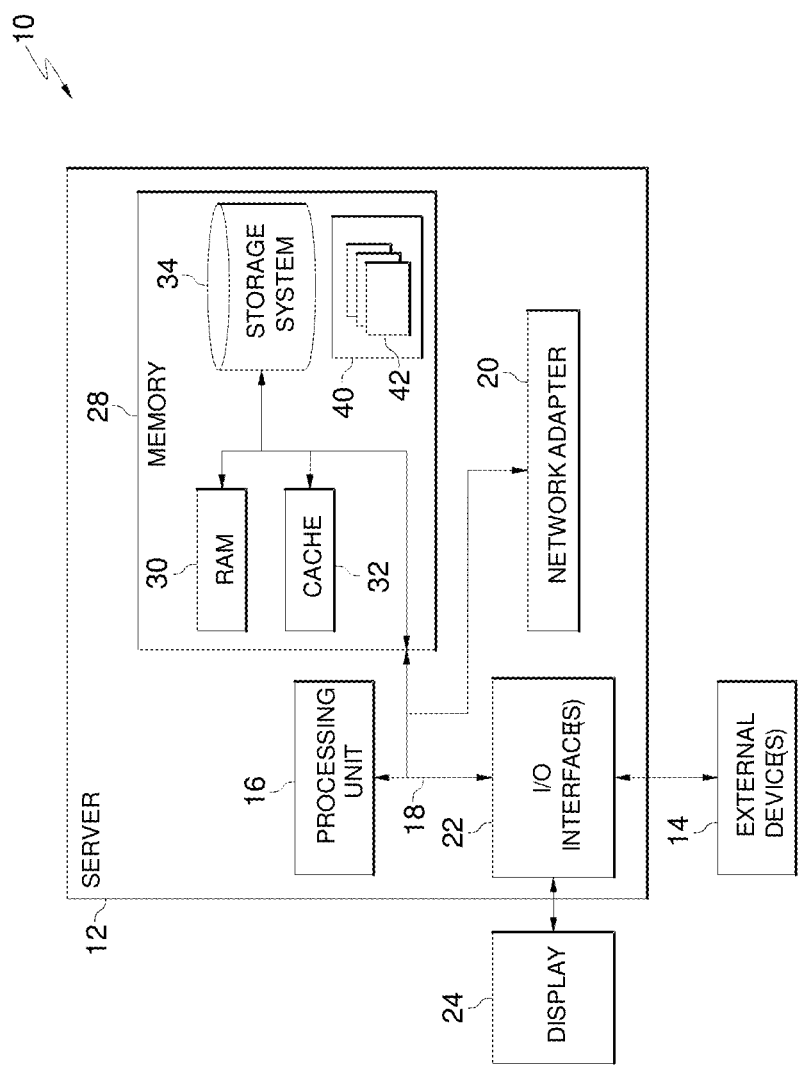
FIG. 1 depicts a cloud computing node according to one or more embodiments of the present invention.

In the context of this description, the following conventions, terms and/or expressions may be used:

An anonymous encryption scheme may be defined as a scheme that does not reveal any information about the identity of the secret key and the secret-key holder. Anonymous encryption schemes are well known in the art. An overview of such anonymous encryption schemes is e.g. given in Mohassel, P., Abe, M. (Ed.): A closer look at anonymity and robustness in encryption schemes, ASIACRYPT 2010, LNCS 6477, pp. 501-518, 2010. Anonymous encryption schemes may be symmetric or asymmetric. In case of an asymmetric anonymous encryption scheme, the ciphertext does not reveal any information about the public key that was used to create the ciphertext. Symmetric anonymous encryption schemes are e.g. described in Abadi, M., Rogaway, P.: Reconciling two views of cryptography (the computational soundness of formal encryption) 20(3) 395 (2007) or in Desai, A.: The security of all-or-nothing encryption: Protecting against exhaustive key search, pp. 359-375 (2000) or in Fischlin, M.: Pseudorandom function tribe ensembles based on one-way permutations: Improvements and applications, pp. 432-445 (1999).

Asymmetric anonymous encryption schemes are e.g. described in Abdalla, M., Bellare, M., Rogaway, P.: The oracle Diffie-Hellman assumptions and an analysis of DHIES, pp. 143-158 (2001) or in 8. Boneh, D., Franklin, M. K.: Identity-based encryption from the Weil pairing, pp. 213-229 (2001) or in Boyen, X., Waters, B.: Anonymous hierarchical identity-based encryption (without random oracles), pp. 290-307 (2006) or in Cramer, R., Shoup, V.: Design and analysis of practical public-key encryption schemes secure against adaptive chosen ciphertext attack, vol. 33(1), pp. 167-226 (2003).

The references cited above are just examples of anonymous encryption schemes that may be used according to one or more embodiments of the invention, but generally any anonymous encryption scheme that has the properties described above may be used, It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a server 12, which is operational with numerous other general purpose or special purpose computing system environments or configurations. Examples of well-known computing systems, environments, and/or configurations that may be suitable for use with server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Server 12 may be described in the general context of computer system-executable instructions, such as program modules, being executed by a computer system. Generally, program modules may include routines, programs, objects, components, logic, data structures, and so on that perform particular tasks or implement particular abstract data types. Server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, server 12 in cloud computing node 10 is shown in the form of a general-purpose computing device. The components of server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 12 typically includes a variety of computer system readable media. Such media may be any available media that is accessible by server 12, and it includes both volatile and non-volatile media, removable and non-removable media.

System memory 28 can include computer system readable media in the form of volatile memory, such as random access memory (RAM) 30 and/or cache memory 32. Server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Server 12 may also communicate with one or more external devices 14 such as a keyboard, a pointing device, a display 24, etc.; one or more devices that enable a user to interact with server 12; and/or any devices (e.g., network card, modem, etc.) that enable server 12 to communicate with one or more other computing devices. Such communication can occur via Input/Output (I/O) interfaces 22. Still yet, server 12 can communicate with one or more networks such as a local area network (LAN), a general wide area network (WAN), and/or a public network (e.g., the Internet) via network adapter 20. As depicted, network adapter 20 communicates with the other components of server 12 via bus 18. It should be understood that although not shown, other hardware and/or software components could be used in conjunction with server 12. Examples, include, but are not limited to: microcode, device drivers, redundant processing units, external disk drive arrays, RAID systems, tape drives, and data archival storage systems, etc.

Figure 2:
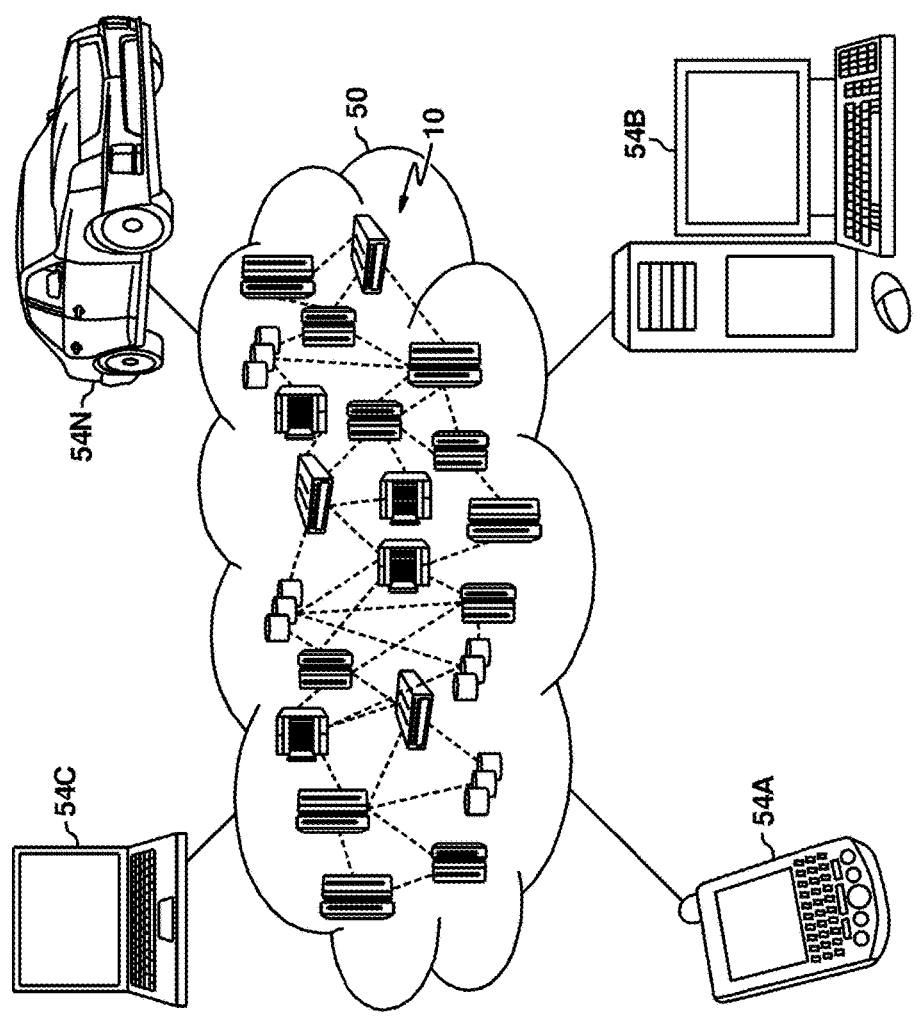
FIG. 2 depicts a cloud computing environment according to one or more embodiments of the present invention.

Referring now to FIG. 2, illustrative cloud computing environment 50 is depicted. As shown, cloud computing environment 50 includes one or more cloud computing nodes 10 with which local user devices used by cloud consumers, such as, for example, personal digital assistant (PDA) or cellular telephone 54A, desktop computer 54B, laptop computer 54C, and/or automobile computer system 54N may communicate. The user devices 54A, 54B, 54C and 54N may in the following be also generally referred to as user devices 54. The user devices 54 may belong to the same user or a user group. User devices 54 that belong to the same user or a user group are referred to as set 55 of user devices 54. Nodes 10 may communicate with one another.

They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
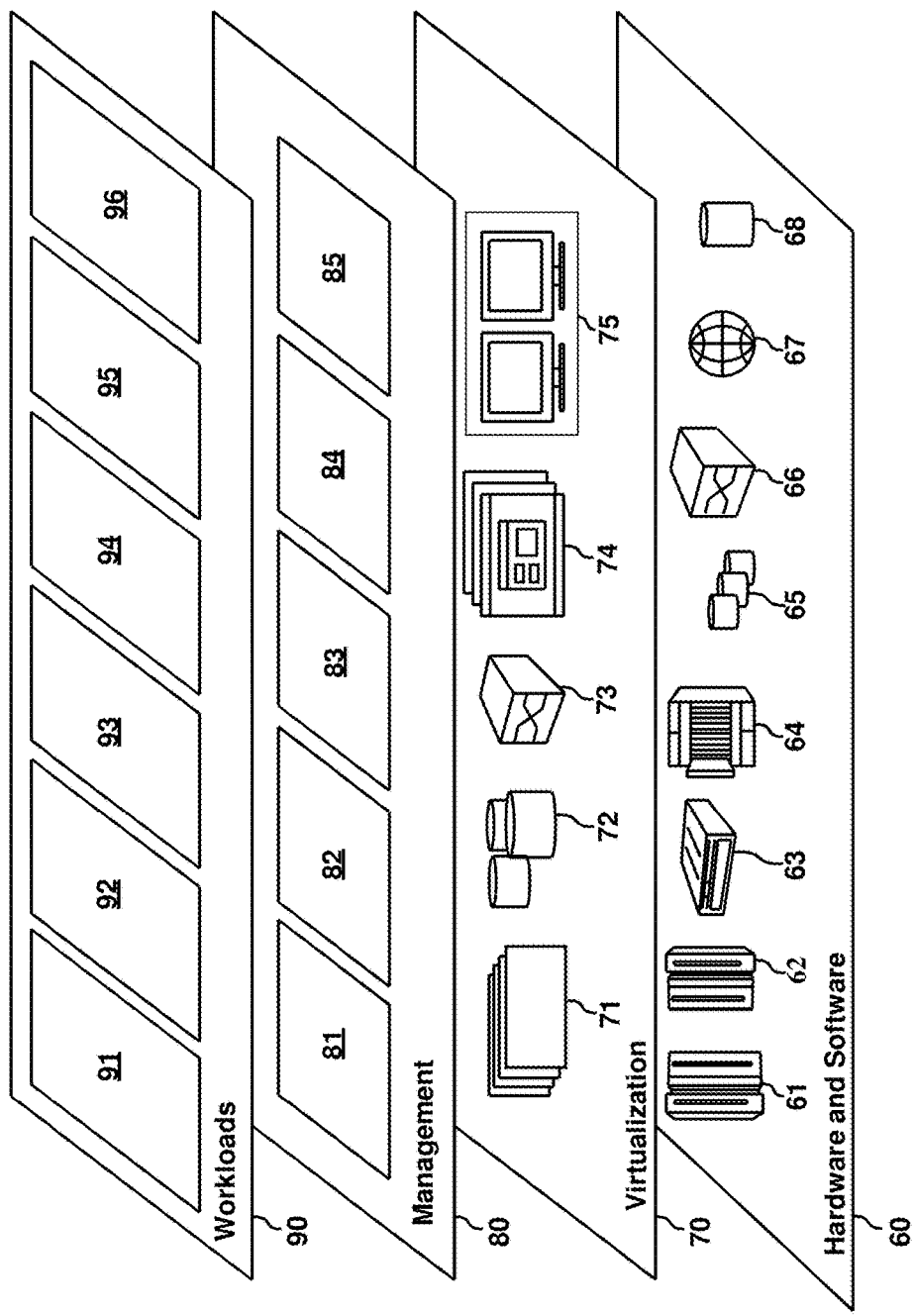
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing anonymous storage services 96.

Figure 4:
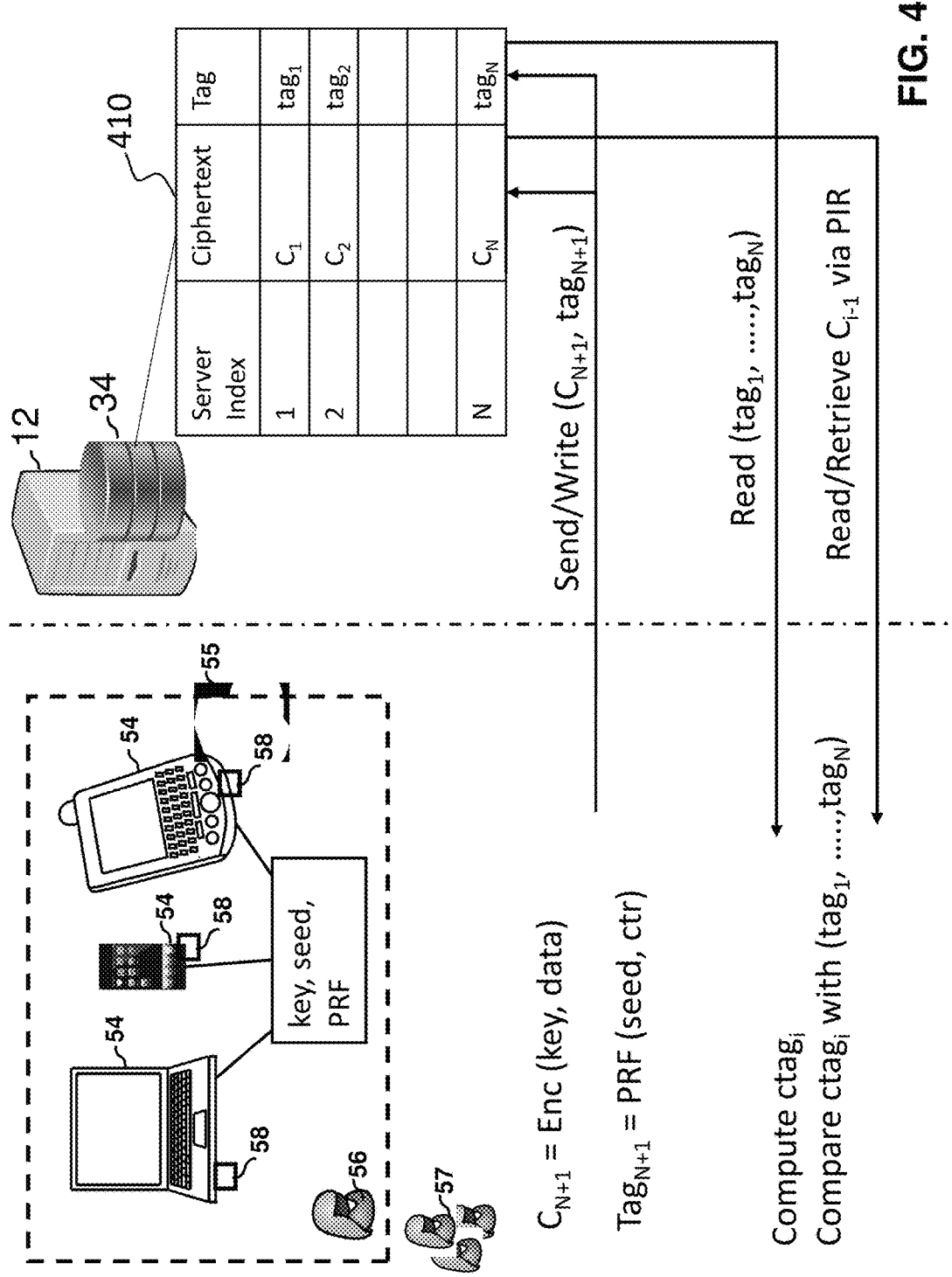
FIG. 4 illustrates a basic setup and corresponding method steps of a system according to one or more embodiments of the invention.

FIG. 4 illustrates a basic setup and corresponding method steps of a system according to one or more embodiments of the invention. On the left side there is illustrated a set 55 of user devices 54 which are configured to perform anonymous read/write accesses to a storage system 34 of a server 12. The user devices 54 may correspond to the user devices 54A, 54B, 54C and 54N of FIG. 2. The set 55 of the user devices 54 is associated to a common user 56 or a user group 57. In other words, the user devices 54 are operated by the single user 56 or by several users of the user group 55. The user group 55 may be e.g. a family or a group of colleagues that share the user devices 54 and some applications running on it. The user devices 54 are configured to perform anonymous read/write accesses to the storage system 34 of the server 12. Furthermore, the user devices 54 are configured to synchronize the data that the user devices 54 write/store to the storage system 34 and read/retrieve from the storage system 34. Accordingly the user 56 of the set 55 of user devices 54 is provided with the latest version of the data when she reads/retrieves data from the storage system 34 of the server 12. The server 12 may be in particular a cloud server that provides storage services and other services in the cloud. As an example, the user 56 may run a calendar application on all the user devices 54 of the set of user devices 55. Such a calendar application needs to be regularly updated/synchronized between the user devices 54 so that all user devices 54 have access to the latest calendar entries made to one of the user devices 54.

The user devices 54 are configured to share a joint encryption key, a joint pseudorandom function PRF and a joint seed for the pseudorandom function. The encryption key, the pseudorandom function PRF and the seed may be stored in a secure memory of the user devices 54. Furthermore according to the embodiment of FIG. 4 all the devices 54 comprise a counter 58 for computing a tag number.

The storage system 34 of the server 12 is configured to store a plurality of ciphertexts Ci together with a server index i and a corresponding tag $tag_i$ as illustrated in the table 410 of FIG. 4.

Figure 5:
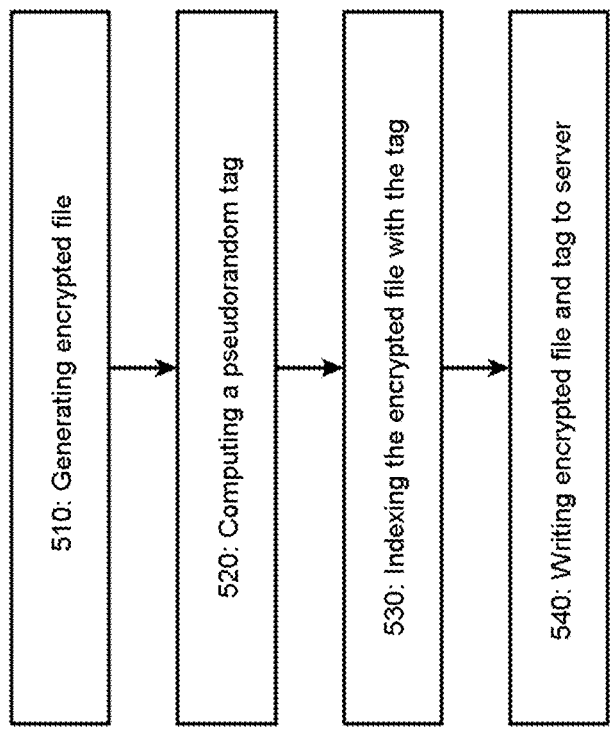
FIG. 5 shows a flow chart of methods steps of write accesses of user devices of a set of user devices in accordance with one or more embodiments.

FIG. 5 shows a flow chart of methods steps of write accesses of the user devices 54 of the set 55 of FIG. 4.

Figure 6:
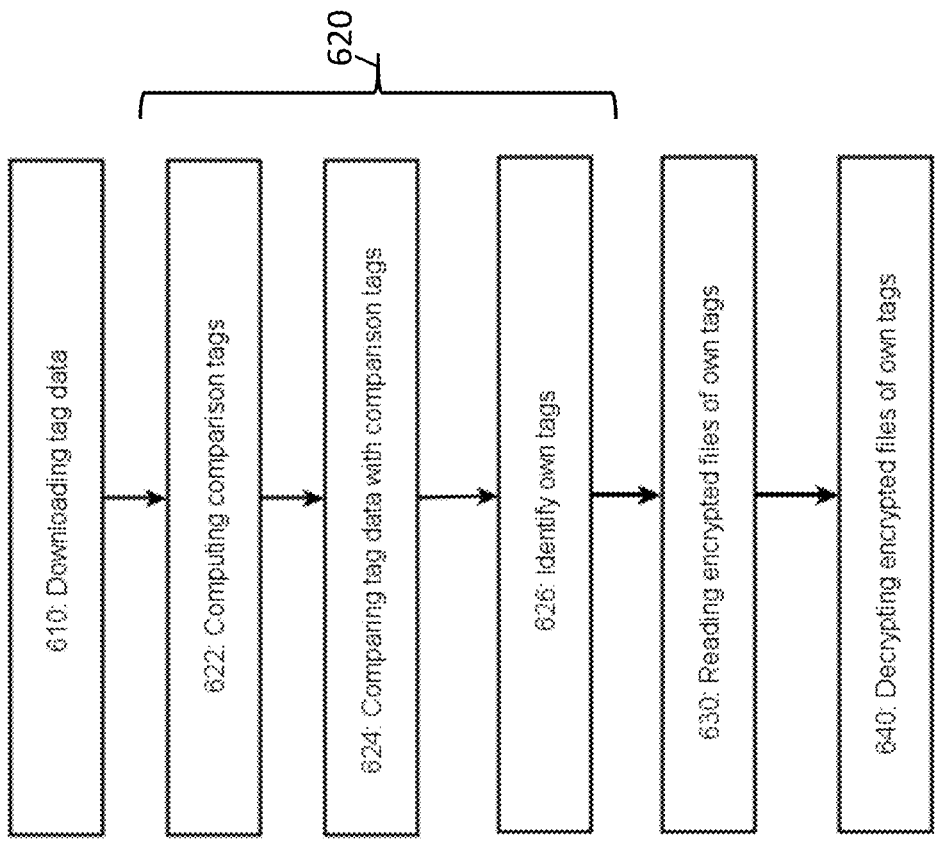
FIG. 6 shows a flow chart of methods steps of read accesses of user devices a set of user devices in accordance with one or more embodiments.

FIG. 6 shows a flow chart of methods steps of read accesses of the user devices 54 of the set 55 of FIG. 4.

In the following an exemplary embodiment of methods steps of write accesses and read accesses will be explained with reference to FIGS. 4, 5 and 6.

At a step 510, one of the user devices 54 generates an encrypted file by an anonymous encryption scheme. Referring to FIG. 4, the user device 54 computes as encrypted file a ciphertext $C_{N+1}$ by encrypting data to be written with an encryption key. The encryption key may be a secret key of a symmetric encryption scheme or a public key of an asymmetric encryption scheme.

At a step 520, the user device 54 computes a pseudorandom tag $tag_{N+1}$ by computing a pseudorandom function of the seed and a counter value ctr. The counter value ctr is provided by the respective counter 58 of the user devices 54. The counter value ctr represents a tag number and the tag number ctr is a unique number for the computation of the tags of the set 55 of user devices 54. In other words, it is ensured that the tag number ctr is only used once for the computation of a tag of a respective set 55. This enables the user devices to subsequently identify/recognize their encrypted files by means of their own tags, i.e. the tags that have been computed by one of the user deices 54 of the respective set 55.

At a step 530, the respective user device 54 indexes the encrypted file with the tag $tag_{N+1}$ as user set index of the user set. In other words, the tag $tag_{N+1}$ represents a tag indicating to the user devices of the set that the tag belongs to an encrypted file that was encrypted by one of the user devices 54 of the set 55.

At a step 540, the user device 54 send/writes the encrypted file and the associated tag to the central server 12.

Referring to FIG. 4, the user device 54 writes or sends the ciphertext $C_{N+1}$ and the corresponding tag $tag_{N+1}$ to the table 410 of the storage system 34.

Referring now to FIG. 6, a read accesses of one the user devices 54 comprises at a step 610 downloading tag data corresponding to a plurality of tags from the server 12.

Tag data may be generally defined as data that enables all of the user devices 54 of a respective set 55 to recognize own tags. Own tags are understood as tags that have been computed by one of the user devices 54 of a respective set 55 of user devices. In other words, the tags serve as an identifier for the user devices 54 of a respective set 55 to identify encrypted files that have been generated by one of the user devices 54 of the respective set 55.

According to the embodiment as illustrated with reference to FIG. 4 the tag data is embodied by the tags itself and hence downloading tag data comprises downloading/reading a plurality of tags ($tag_1, \ldots, tag_N$). According to one or more embodiments downloading tag data may comprise downloading one or more bloom filters which will be explained further below.

At a step 620 own tags, i.e. tags of the respective set 55 of user devices 54 are determined among the plurality of downloaded tags ($tag_1, \ldots tag_N$). More particularly, the downloaded tags ($tag_1, \ldots tag_N$) comprise not only tags of the own set of user devices, but also tags of other sets of user devices.

The step 620 comprises some sub-steps:

At a step 622, the respective user device 54 computes comparison tags $ctag_i$ by computing a pseudorandom function PRF of the seed and a predefined set of tag numbers. In the example of FIG. 4, the tag numbers are counter values ctr. Generally the predefined set of tag numbers comprises tag numbers that have been previously used by user devices 54 of one or more sets 55 of user devices. In the example of FIG. 4 the tag numbers are counter values ctr that have been previously issued by one of the counters 58 of the user devices 54.

At a step 624, the respective user device 54 compares the downloaded tag data with the computed comparison tags to identify matching tags. Referring again to FIG. 4, the computed comparison tags $ctag_i$ are compared with the downloaded tags ($tag_1, \ldots, tag_N$).

Then at a step 626 own tags are identified by the respective user device 54. Subsequently at a step 630 an encrypted file/ciphertext Ci that has been identified as own file by means of the tag $tag_i$ is read/retrieved from the storage system 34 of the server 12. The retrieval may be performed in particular by performing a private information retrieval (PIR) protocol or by performing an oblivious transfer protocol. Such protocols are well known in the art. A private information retrieval protocol is e.g. described in Chor, B. et al: Private Information Retrieval, Journal of the ACM (JACM), Volume 45 Issue 6, November 1998, Pages 965-981.

Finally at a step 640 the encrypted file Ci is decrypted by the user device 54 by means of the secret key of the anonymous encryption scheme.

Figure 7:
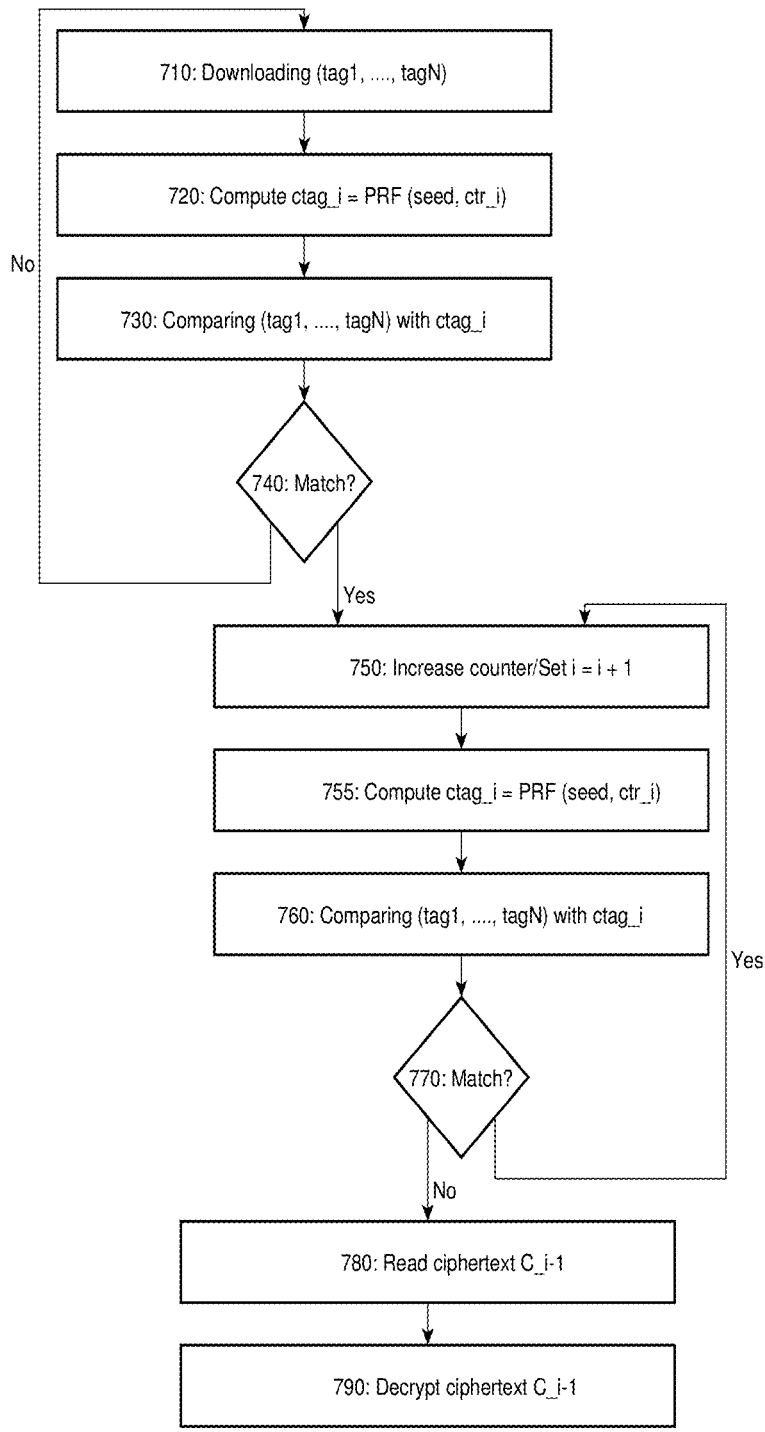
FIG. 7 shows a flow chart of methods steps of read accesses according to the system of FIG. 4 in more detail in accordance with one or more embodiments.

FIG. 7 shows a flow chart of methods steps of a read-access according to the system of FIG. 4 in more detail. Accordingly the user devices 54 are equipped with the counter 58.

At a step 710, a plurality of tags ($tag_1, \ldots, tag_N$) is downloaded from the server 12.

At a step 720, the respective user device 54 that has downloaded the tags ($tag_1, \ldots, tag_N$) computes comparison tags ctag_i as a pseudorandom function of the seed and a counter value ctr_i. The counter value ctr_i is the last counter value that was used by the counter 58 of the respective device 54.

It should be noted that the expressions ctag_i/ctag$_i$, ctr_i/ctr$_i$ and C_i/C$_i$ are used interchangeably.

At a step 730, the user device 54 compares the downloaded tags (tag$_1$, . . . , tag$_N$) with ctag_i. At a step 740 the user device 54 decides whether there is a match, i.e. whether one of the tags (tag$_1$, . . . , tag$_N$) equals ctag_i.

If there is no match, the method returns to step 710 and downloads more tags. This may be e.g. the case if the respective user device 54 has not been used for a longer period of time and hence tags of the respective user device are pretty old and have not been downloaded in the first round.

If there is a match, the user device 54 increases the counter value at a step 750 by 1, i.e. it sets the counter value to ctr_i+1, or in general terms it sets ctr_i$_{new}$=ctr_i$_{old}$+1. Then it computes at a step 755 a new comparison tag ctag_i as a pseudorandom function of the seed and the new increased counter value ctr_i. The rationale behind this is to synchronize the counters 58 of the various user devices 54 of the set 55. As an example, if the current read access is performed by the cellular telephone 54A of FIG. 2, it might well be that the desktop computer 54B has written some updated data/files to the storage system 34 after the last update/write access performed by the cellular telephone 54A. Accordingly the counter of the desktop computer 54B has a higher value than the counter of the cellular telephone 54A.

At a step 760, the user device 54 compares the downloaded tags (tag$_1$, . . . , tag$_N$) with ctag_i. At a step 770 the user device 54 decides whether there is a match, i.e. whether one of the tags (tag$_1$, . . . , tag$_N$) equals ctag_i.

If there is a match, the method returns again to step 750, increases the counter value and computes at a new step 755 another new comparison tag ctag_i as a pseudorandom function of the seed and the increased counter value ctr_i. This loop is repeated until there is no match.

If there is no match, the user device 54 concludes that the previous counter value ctr_i was the latest counter value used by one of the devices 54 of the respective set 55. Then at a step 780 it reads/retrieves an encrypted file C_i−1 that has been identified as own file by the last matching comparison between the comparison tag ctag_i−1 and the corresponding matching downloaded tag. Hence it reads the encrypted file associated to the tag with the highest counter value that resulted in a match.

Finally at a step 790 the encrypted file C_i−1 is decrypted by the user device 54 by means of the secret key of the anonymous encryption scheme.

Figure 8:
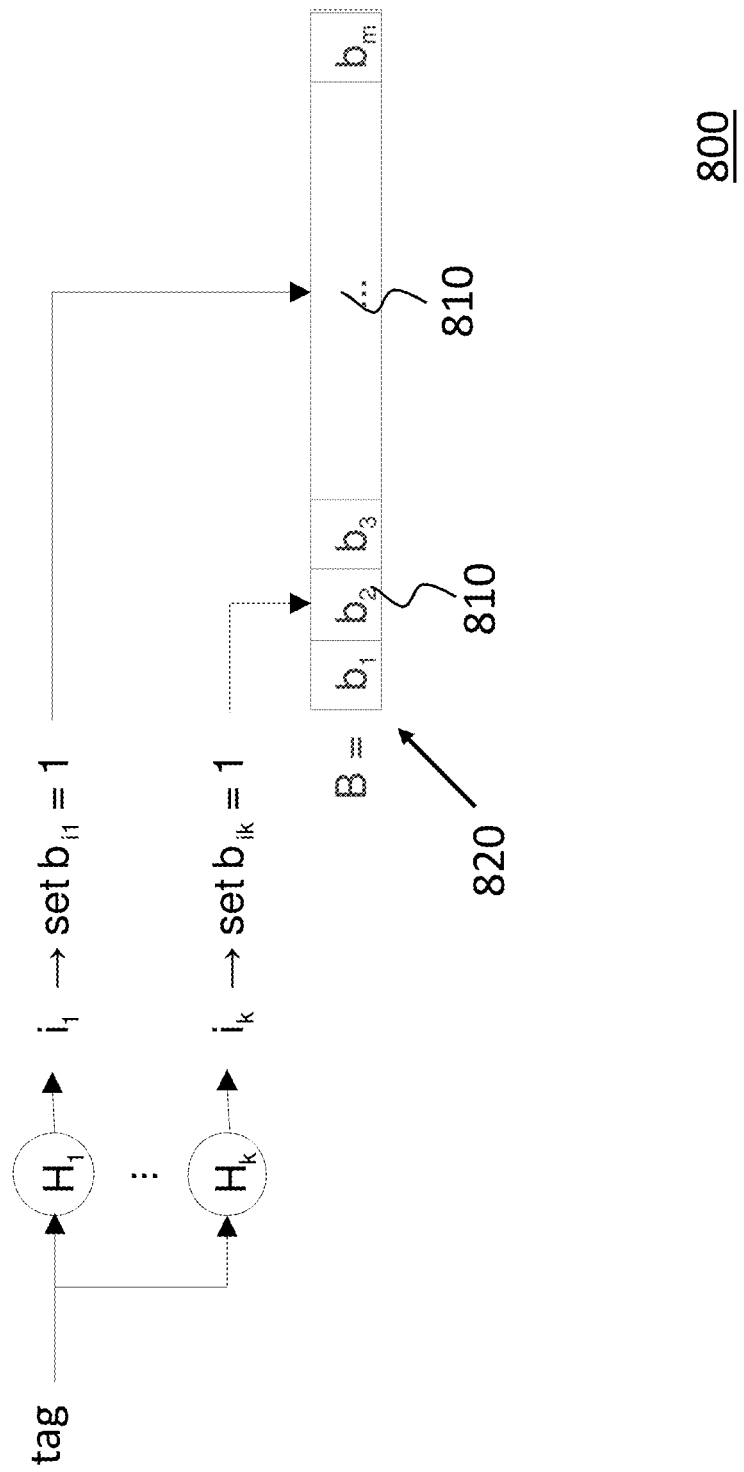
FIG. 8 shows a bloom filter according to one or more embodiments of the invention.

FIG. 8 shows an exemplary embodiment of a bloom filter 800. The bloom filter 800 performs a mapping of the tags to one or more bit positions 810 of an array 820 of the bloom-filter 800. The bloom filter 800 is a probabilistic data structure that allows in an easy and efficient way to test whether a tag tag$_i$ is a member of the tags (tag1, . . . , tagN) that have been mapped to the bloom filter. In order to add a tag to the bloom filter 800, k different hash-functions $H_1, \ldots, H_k$ are computed for the tag and each of the hash functions map the tag to one of the m array positions 810 of the array 820 with a uniform random distribution. In mathematical terms this may be described as $$H_{1, \ldots, k}:\{0,1\}^* \to \{1, \ldots, m\}$$

To test whether a tag is in Bloom filter B, it has to be checked for all i=1, . . . , k whether $$b_{Hi(tag)}=1.$$

The bloom filter 800 may provide false positives, but no false negatives. The approximate filter length m for a false positive rate p may be estimated by m≈−2n ln(p), wherein n is the number of tags that shall be stored in the bloom filter.

Figure 9:
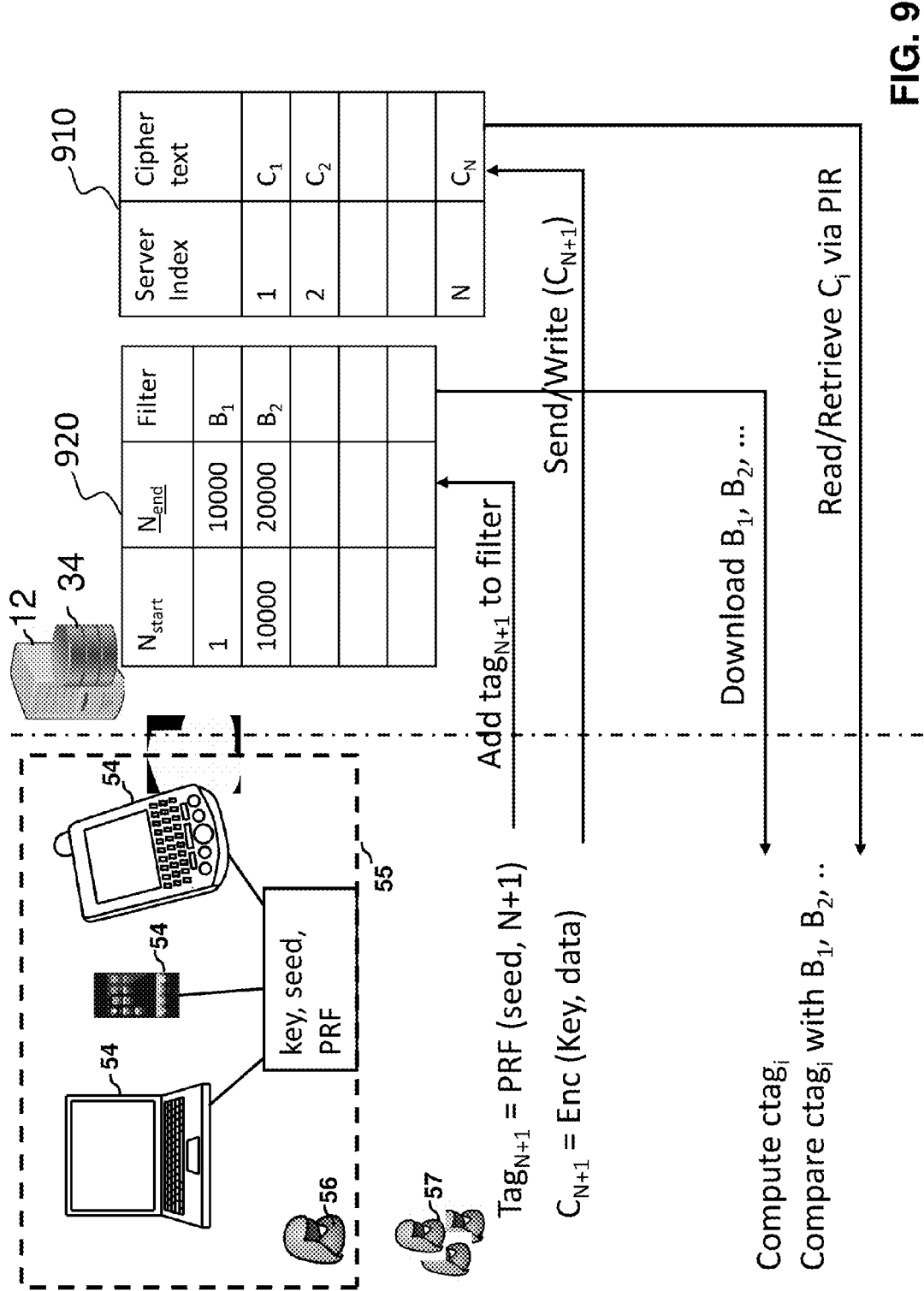
FIG. 9 shows another basic setup and corresponding method steps of a system according to one or more embodiments of the invention utilizing a bloom filter.

FIG. 9 illustrates a basic setup and corresponding method steps of another system according to one or more embodiments of the invention. The general setup corresponds to the setup as illustrated with reference to FIG. 4. Accordingly on the left side there is a set 55 of user devices 54 which are configured to perform anonymous read/write accesses to a storage system 34 of a server 12. The user devices 54 are configured to share a secret key, a pseudorandom function PRF and a seed for the pseudorandom function. However, in contrast to the setup in FIG. 4 the user devices 54 do not comprise a counter, but rather use a server index received from the server 12 as tag numbers. In addition, according to the setup of FIG. 9, the storage system 34 is configured to store bloom filters for the tags instead of the tags itself.

The storage system 34 of the server 12 is configured to store ciphertexts Ci together with a server index i in a table 910. Furthermore, the storage system 34 is configured to store in a table 920 bloom filters $B_1$, $B_2$ and possibly more that comprise a mapping of tags received from the user devices 54 to the array positions of the array of the bloom filters. In this example the bloom filter B1 comprises a mapping of the tags tag$_1$, . . . , tag$_{10000}$ and the bloom filter B2 comprises a mapping of the tags tag$_{10000}$, . . . , tag$_{20000}$.

Figure 10:
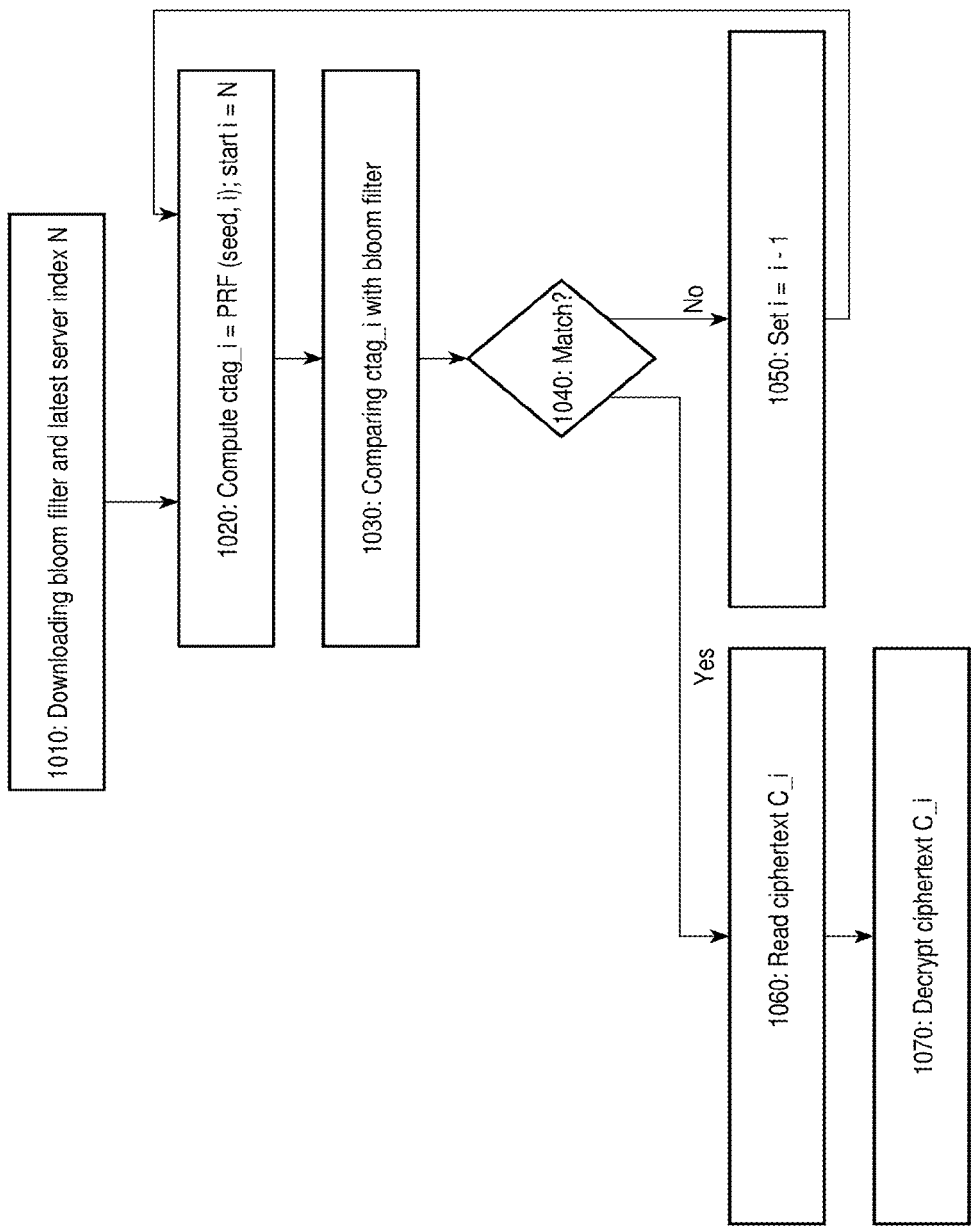
FIG. 10 shows a flow chart of methods steps of read accesses of the system of FIG. 9 in more detail.

FIG. 10 shows a flow chart of methods steps of read accesses of the user devices 54 of the set 55 of FIG. 9 in more detail In the following an exemplary embodiment of methods steps of write accesses and read accesses will be explained with reference to FIGS. 9 and 10.

For write accesses, one of the user devices 54 computes as encrypted file a ciphertext C$_{N+1}$ by encrypting data to be written with an encryption key. Furthermore, the user device 54 computes a pseudorandom tag tag$_{N+1}$ by computing a pseudorandom function of the seed and a server index N+1. The server index N+1 may be received from the server 12 and may be considered as a slot for the next free storage space of the storage system 34. Hence in this example the server index N+1 represents the tag number which is again a unique number for the computation of the tags of the set 55 of user devices 54. According to this embodiment the user device 54 sends the ciphertext C$_{N+1}$ to the server 12 and the server 12 writes it to the table 910 of the storage system 34. Furthermore, the server 12 adds the corresponding tag tag$_{N+1}$ to the current bloom filter of table 920. More particularly, the server 12 receives the tag tag$_{N+1}$, computes the corresponding hash functions for the tag tag$_{N+1}$ and updates the corresponding array of the current bloom filter $B_i$.

For a read access the respective device 54 downloads at a step 1010 one or more bloom filters $B_1, B_2, \ldots B_N$ as well as the latest server index N issued by the server 12.

At a step 1020, the respective user device 54 that has downloaded the bloom filters computes comparison tags ctag_i as a pseudorandom function of the seed and the latest server index N received from the server 12.

At a step 1030, the user device 54 compares the comparison tag ctag_i with the downloaded bloom filters $B_1$ and $B_2$. At a step 1040 the user device 54 decides whether there is a match, i.e. whether the comparison tag ctag_i is a member of one the bloom filters $B_1$ and $B_2$.

If there is no match, the user device 54 decreases at a step 1050 the server index by 1, i.e. it sets the server index to N−1, or in general terms it sets $i_{new}=i_{old}-1$. Then it returns to step 1020 and computes in another step 1030 a new comparison tag ctag_N−1 as a pseudorandom function of the seed and the reduced server index N−1. Then at a new step 1040 it decides whether there is a match. If there is again no match, the loop is repeated by decreasing again the server index until there is a match.

If there is a match, then at a step 1060 the user device 54 reads/retrieves an encrypted file/ciphertext C_i.

Finally at a step 1070 the encrypted file C_i is decrypted by the user device 54 by means of the secret key of the anonymous encryption scheme.

According to an alternative embodiment the tag number may be a nonce generated by the user devices 54. According to such an embodiment a write access comprises writing the nonce together with the encrypted file and the associated tag to the server 12. Furthermore, a read access comprises downloading the tag data or the tags respectively and the corresponding nonces from the server 12 and computing comparison tags by computing the pseudorandom function of the seed and the downloaded nonces.

Figure 11:
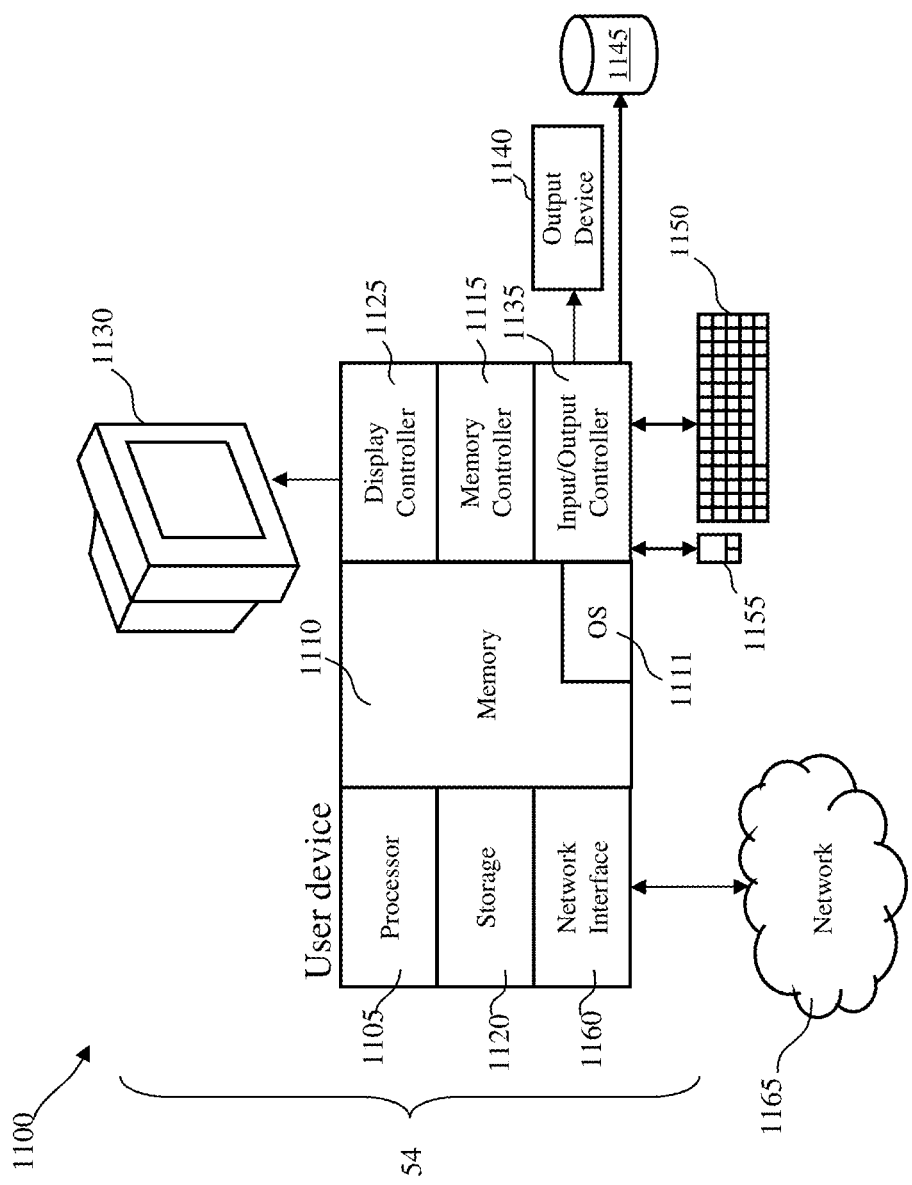
FIG. 11 shows a detailed block diagram of a user device according to one or more embodiments of the invention.

FIG. 11 shows a schematic block diagram of system 1100 comprising a more detailed embodiment of a user device 54. According to this example the user device 54 is illustrated as desktop computer. In exemplary embodiments, in terms of hardware architecture, as shown in FIG. 11, the user device 54 includes a processor 1105, memory 1110 coupled to a memory controller 1115, and one or more input and/or output (I/O) devices 1140, 1145, 1150, 1155 (or peripherals) that are communicatively coupled via a local input/output controller 1135. The input/output controller 1135 can be, but is not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1105 is a hardware device for executing software, particularly that stored in memory 1110. The processor 1105 can be any custom made or commercially available processor, a central processing unit (CPU), an auxiliary processor among several processors associated with the computer 1101, a semiconductor based microprocessor (in the form of a microchip or chip set), or generally any device for executing software instructions.

The memory 1110 can include any one or combination of volatile memory elements (e.g., random access memory) and nonvolatile memory elements. Moreover, the memory 1110 may incorporate electronic, magnetic, optical, and/or other types of storage media. Note that the memory 1110 can have a distributed architecture, where various components are situated remote from one another, but can be accessed by the processor 1105.

The software in memory 1110 may include one or more separate programs, in particular a program for performing anonymous read/write accesses to a central cloud server. In the example of FIG. 11, the software in the memory 1110 includes methods described herein in accordance with exemplary embodiments and a suitable operating system (OS) 1111. The OS 1111 essentially controls the execution of other computer programs, such as the methods as described herein, and provides scheduling, input-output control, file and data management, memory management, and communication control and related services.

Possibly, a conventional keyboard 1150 and mouse 1155 can be coupled to the input/output controller 1135 (in particular for the BS, if needed). Other I/O devices 1140-1155 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 1135 for further processing.

In addition, the I/O devices 1140-1155 may further include devices that communicate both inputs and outputs. The system 1100 can further include a display controller 1125 coupled to a display 1140. In exemplary embodiments, the system 1100 can further include a network interface or transceiver 1160 for coupling to a network 1165.

The network 1165 transmits and receives data between the user device 54 and external systems, in particular a server 12 as described with reference to FIG. 1. The network 1165 is possibly implemented in a wireless fashion, e.g., using wireless protocols and technologies, such as WiFi, WiMax, etc. The network 1165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 1165 can also be an IP-based network for communication between the unit 1101 and any external server, client and the like via a broadband connection, in particular with a cloud server such as the server 12 as described with reference to FIG. 1. In exemplary embodiments, network 1165 can be a managed IP network administered by a service provider. Besides, the network 1165 can be a packet-switched network such as a LAN, WAN, Internet network, etc.

If the unit 1101 is a PC, workstation, intelligent device or the like, the software in the memory 1110 may further include a basic input output system (BIOS). The BIOS is stored in ROM so that the BIOS can be executed when the computer 1101 is activated.

When the user device 54 is in operation, the processor 1105 is configured to execute software stored within the memory 1110, to communicate data to and from the memory 1110, and to generally control operations of the computer 1101 pursuant to the software. The methods described herein and the OS 1111, in whole or in part are read by the processor 1105, typically buffered within the processor 1105, and then executed.

The present invention may be a system, a method, and/or a computer program product. The computer program product may include a computer readable storage medium (or media) having computer readable program instructions thereon for causing a processor/processing unit of the server 12 and/or the user devices 54 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing anonymous read/write accesses of a set of user devices to a server, the set of user devices being associated to a user or user group;
    wherein write accesses of one of the user devices of the set comprise:

generating, using a processor system of the one of the user devices of the set, an encrypted file by an anonymous encryption scheme;

computing, using the processor system, a pseudorandom tag;

indexing the encrypted file with the tag as user set index of the user set;

sending the encrypted file and the associated tag to a storage system of the server; and wherein read accesses of the one of the user devices of the set comprise:

downloading tag data corresponding to a plurality of tags from the server, the tag data enabling the user devices of a respective set to recognize own tags, wherein own tags comprise tags computed by one of the user devices of the respective set of user devices;

determining the own tags among the plurality of tags;

reading one or more encrypted files associated to the own tags; and decrypting the encrypted files;

wherein computing a pseudorandom tag comprises computing a pseudorandom function of a seed and a tag number, the tag number being a unique number for the computation of the tags of the set of user devices; and wherein determining own tags comprises:

computing comparison tags by computing a pseudorandom function of the seed and a predefined set of tag numbers;

comparing the downloaded tag data with the computed comparison tags to identify matching tags;

wherein the predefined set of tag numbers comprises tag numbers that have been previously used by user devices of one or more sets of user devices.

2. A computer-implemented method according to claim 1, further comprising providing the user devices with one or more encryption keys and one or more corresponding decryption keys of the anonymous encryption scheme;

providing the user devices with a joint pseudorandom function and a joint seed;

encrypting a file to be stored with at least one of the one or more encryption keys; and computing the pseudorandom tag by means of the pseudorandom function from the joint seed and the tag number.

3. A computer-implemented method according to claim 1, wherein the tag number is a counter value computed by a counter of the user devices.

4. A computer-implemented method according to claim 3, comprising:

comparing, by the respective user device, a latest tag computed by the user device with the downloaded tag data;

downloading additional tags in case there is no match;

increasing, in case of a match, the counter value and compute a new tag by means of the pseudorandom function from the seed and the increased counter value;

comparing, by the respective user device, the new tag with the downloaded tag data;

repeating the increasing step and the subsequent comparing step until no match is found; and reading the encrypted file associated to the tag with the highest counter value that resulted in a match.

5. A computer-implemented method according to claim 1, wherein the tag number is a nonce generated by the user devices;

a write access comprises writing the nonce together with the encrypted file and the associated tag to the server; and a read access comprises downloading the tag data and the corresponding nonces from the server.

6. A computer implemented method according to claim 5, comprising:

downloading a plurality of tags and the associated nonces from the server;

computing comparison tags by computing the pseudorandom function of the seed and the downloaded nonces; and comparing the comparison tags with the tag data to identify matches.

7. A computer-implemented method according to claim 1, wherein the tag number is a server index provided by the server.

8. A computer-implemented method according to claim 7, wherein read accesses comprise receiving the latest server index issued from the server;

computing comparison tags in a sequential decreasing order as a pseudorandom function of the seed and a tag number, wherein the tag number is sequentially reduced starting from the latest server index; and comparing the comparison tags with the tag data to identify matches.

9. A computer-implemented method according to claim 1, wherein reading one or more encrypted files comprises performing a private information retrieval (PIR) protocol.

10. A computer-implemented method according to claim 1, wherein reading one or more encrypted files comprises performing an oblivious transfer protocol.

11. A computer-implemented method according to claim 1, wherein the anonymous encryption scheme is a symmetric or asymmetric encryption scheme.

12. A computer-implemented method according to claim 1, wherein downloading tag data comprises downloading a plurality of tags.

13. A computer-implemented method according to claim 1, wherein downloading tag data comprises downloading one or more bloom-filters, wherein the bloom-filters comprise a mapping of the tags to one or more positions of an array of the bloom-filter.

14. A user device for performing anonymous read/write accesses to a server, the user device being associated to a user or user group, wherein the user device is configured to:

perform write accesses comprising:

generating, using a processor system of the user device, an encrypted file by an anonymous encryption scheme;

computing, using the processor system, a pseudorandom tag;

indexing the encrypted file with the tag as user set index of the user set; and sending the encrypted file and the associated tag to a storage system of the server;

perform read accesses comprising:

downloading tag data corresponding to a plurality of tags from the server, the tag data enabling user devices of a respective set to recognize own tags computed by one of the user devices of the respective set of user devices;

determining the own tags among the plurality of tags;

reading one or more encrypted files associated to the own tags; and decrypting the encrypted files;

wherein computing a pseudorandom tag comprises computing a pseudorandom function of a joint seed of the set of user devices and a tag number, the tag number being a unique number for the computation of the tags of the set of user devices; and wherein determining own tags comprises:

computing comparison tags by computing a pseudorandom function of the joint seed and a predefined set of tag numbers;

comparing the downloaded tag data with the computed comparison tags to identify matching tags;

wherein the predefined set of tag numbers comprises tag numbers that have been previously used by user devices of one or more sets of user devices.

15. A user device according to claim 14, wherein the user device is configured to:

encrypt a file to be stored with a joint encryption key of the set of user devices.

16. A computer program product for anonymous read/write accesses of a set of user devices to a server, the set of user devices being associated to a user or user group;

the computer program product comprising a non-transitory computer readable storage medium having program instructions embodied therewith, the program instructions executable by the user devices to cause the user devices to perform a method comprising:

performing write accesses comprising:

generating an encrypted file by an anonymous encryption scheme;

computing a pseudorandom tag;

indexing the encrypted file with the tag as user set index of the user set; and sending the encrypted file and the associated tag to a storage system of the server; and performing read accesses comprising:

downloading tag data corresponding to a plurality of tags from the server, the tag data enabling user devices of a respective set to recognize own tags, wherein own tags comprise tags computed by one of the user devices of the respective set of user devices;

determining the own tags among the plurality of tags;

reading one or more encrypted files associated to the own tags; and decrypting the encrypted files;

wherein computing a pseudorandom tag comprises computing a pseudorandom function of a joint seed of the set of user devices and a tag number, the tag number being a unique number for the computation of the tags of the set of user devices; and wherein determining own tags comprises:

computing comparison tags by computing a pseudorandom function of the joint seed and a predefined set of tag numbers;

comparing the downloaded tag data with the computed comparison tags to identify matching tags;

wherein the predefined set of tag numbers comprises tag numbers that have been previously used by user devices of one or more sets of user devices.

17. A computer program product according to claim 16, wherein the program instructions are executable by the user devices to cause the user devices to perform a method comprising:

encrypting a file to be stored with a joint encryption key of the set of user devices.

* * * * *